United States Patent Office 3,632,492
Patented Jan. 4, 1972

3,632,492
PROCESS FOR THE MANUFACTURE OF
3-FORMYLRIFAMYCIN-SV
Hans Bickel, Binningen, and Wilhelm Kump, Therwil, Switzerland, assignors to Ciba Geigy Corporation, New York, N.Y.
No Drawing. Original application May 21, 1968, Ser. No. 730,911, now Patent No. 3,524,845, dated Aug. 18, 1970. Divided and this application May 4, 1970, Ser. No. 34,536
Claims priority, application Switzerland, May 29, 1967, 7,533/67
Int. Cl. B01j 1/10
U.S. Cl. 204—158 R             14 Claims

ABSTRACT OF THE DISCLOSURE

A new process for preparing 3-formylrifamycin-SV in high yield and smooth reaction is based on a finding that when rifamycin S derivatives having in 3-position a free or a substituted aminomethyl group are irradiated with ultraviolet light in a suitable solvent, tautomeric compounds are formed which readily hydrolyse to give 3-formylrifamycin. The said 3-aminomethyl-rifamycin S derivatives used as starting materials are obtained in pure form by a special process. These products were hitherto available only in form of their manganese salts; they have antibacterial activity and are useful as medicaments.

CROSS-REFERENCE TO RELATED APPLICATION

This application is a division of our U.S. application Ser. No. 730,911, filed May 21, 1968, and now U.S. Pat. No. 3,524,845.

BACKGROUND OF THE INVENTION

As is known, 3-formylrifamycin has very good antibacterial properties and is also a very important intermediate for the manufacture of numerous derivatives of high antibiotic activity, especially of its functional aldehyde derivatives, for example of the hydrazones. 3-formylrifamycin-SV, which corresponds to the following partial structural formula

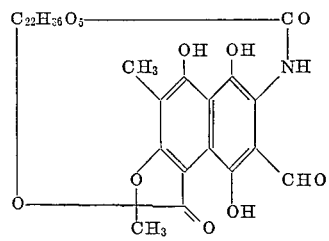

is accessible by the hitherto known process by oxidizing 3-aminomethylrifamycin-SV derivatives of the partial structural formula

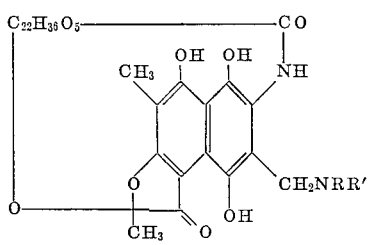

where R and R' represent hydrogen, alkyl, aralkyl, cycloalkyl or, together with the nitrogen atom, the residue of a heterocyclic compound containing one or more than one hetero atom—with a mild oxidizing agent in a suitable solvent. Suitable oxidants are more especially alkylnitrites, lead tetraacetate, persulfates, 1,4-quinones, oxygen in the presence of a catalyst, potassium ferricyanide or manganese dioxide (see British Pat. 1,109,631). The solvent used depends on the oxidant concerned, for example the oxidation with an alkylnitrite or with lead tetraacetate is preferably performed in a halogenated hydrocarbon such as chloroform or carbon tetrachloride, if desired or required, with addition of an aliphatic carboxylic acid, such as acetic acid. The oxidation is carried out at room temperature and should take from 2 to 24 hours depending on the starting material used. Before isolating the oxidation product it is possible to carry out a treatment with ascorbic acid.

It appears that in this process, apart from the desired formation of 3-formylrifamycin-SV, also further reactions occur which give rise to undesired by-products so that the yields of 3-formylrifamycin-SV are always very moderate and never exceed 50% of the theoretical.

SUMMARY OF THE INVENTION

The present invention provides a new process for the manufacture of 3-formylrifamycin-SV in a high yield and by a smooth reaction from 3-aminomethylrifamycin-SV derivatives. It is characterized in that a 3-aminomethyl-rifamycin-S-compound of the formula

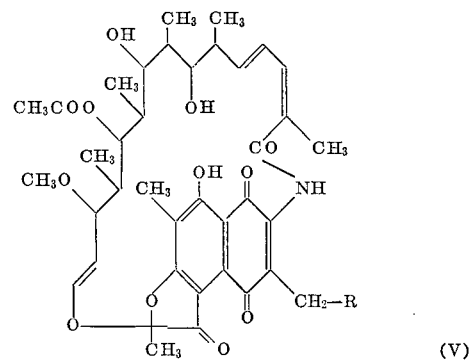

where R represents a free or substituted amino group—is irradiated with ultraviolet light in an anhydrous or aqueous solvent at a low temperature and a possibly obtained 3-aldehyde deerivative of 3-formylrifamycin-SV is hydrolysed.

The starting materials of the above Formula V in pure form and obtainable by a specific process and pharmaceutical preparations containing such compounds which have antibacterial activity, also pertain to the present invention.

DESCRIPTION OF THE PREFERRED EMBODIMENTS

The new proces of the present invention for the manufacture of formyl-rifamycin SV from compounds of the Formula V may be illustrated by the following partial formulae scheme:

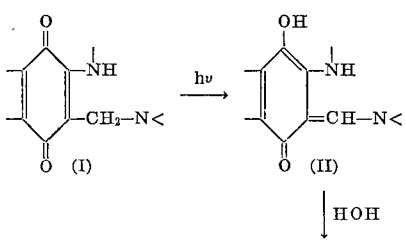

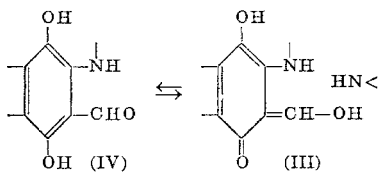

3-formylrifamycin-SV.

This new process is based on the finding that when 3-aminomethyl-rifamycin-S compounds (I) are irradiated with ultraviolet light in a suitable solvent, such as alcohol, they are converted into compounds (II) which are very easy to hydrolyze and thereby furnish readily 3-formyl-rifamycin-SV (III) or (IV) respectively. It may be assumed that during the irradiation a tautomerization takes place and the starting materials are transformed quantitatively into aldehyde derivatives II which are very easy to solvolize, especially to hydrolyze with water, and thereby furnish 3-formylrifamycin-SV derivatives or free 3-formylrifamycin-SV.

In the above Formula V R represents a free amino group or an amino group substituted by one or two aliphatic, aromatic, cycloaliphatic, araliphatic or heterocyclic residues. Aliphatic hydrocarbon residues may also be interrupted in the carbon chain by hetero atoms such as oxygen, nitrogen or sulphur atoms, and/or they may be substituted by one, two or more identical or different functional groups such as hydroxyl groups, halogen atoms, free or esterified carboxyl or sulphonic acid groups, aldehyde groups, nitrile or amino groups. Preferably, they do not contain more than 12 carbon atoms and contain in the first place from 1 to 8 carbon atoms. Suitable residues R are, above all, saturated or mono-unsaturated residues, for example lower alkyl, alkenyl, alkylene, cycloalkyl, cycloalkenyl, cycloalkylalkyl or cycloakenylalkyl groups, or phenylalkyl such as phenyl-lower alkyl residues, in which the pheny residues may be unsubstituted or contain one, two or more identical or different substituents such as lower alkyls, lower alkoxy groups, halogen atoms or carboxyl groups. As relevant examples there may be mentioned methyl, ethyl, hydroxy-ethyl, allyl, methallyl, propyl, isopropyl residues; straight or branched butyl, pentyl, hexyl or heptyl groups which may be linked in any desired position; butylene(1,4)- pentylene-(1,5), hexylene-(1,6), hexylene-(1,5), hexylene-(2,5), heptylene-(2,7), heptylene-(2,6); cyclopentyl-, cyclohexyl-, cyclopentenyl-, cyclohexenyl-methyl or -ethyl groups; benzyl, p-chlorobenzyl, p-methoxybenyl, 1-phenyl-ethyl or 2-phenylethyl.

Preferred starting products are those of the above Formula V in which R represents a mono- or di-lower alkyl-amino group or an alkylene-, oxa-, thia- or aza-alkylene-amino group or a phenyl- or N-lower alkyl-N-phenyl-amino group, for example especially the methylamino, ethylamino, propylamino, butylamino, anilino, toluidino, N-methylanilino group or a dimethylamino, diethylamino, dipropylamino, or diisopropylamino, pyrrolidino, piperidino, morpholino, 1-methylpiperazino, 4-carboxypiperidino, 2,5 - dihydroxymethylpyrrolidino, N - methylcyclohexylamino, 2-methylpiperidino or 4-methylpiperidino group.

The irradiation is performed at a low temperature, preferably below −10° C., for example at −15° to −20° C., using natural or artifically produced ultraviolet light such as is emitted, for example, by mercury high-pressure or low-pressure burners, for example those of the type Hanau Q 81. The reaction is complete in most cases after a short time, about 5 to 10 minutes. In general, the irradiation product is of a deep red coloration.

Suitable solvents are above all alcohols, especially lower aliphatic alcohols having a branched carbon chain, such as isopropanol, tertiary butanol or isoamyl alcohol, ethers, especially cyclic ethers such as dioxane, ketones or dimethylformamide or diethylformamide. These solvents may be used in the anhydrous form or they may contain water.

The solution obtained by irradiation in an anhydrous medium probably contains a compound of the type (II) defined above or a corresponding functionally modified hydroxymethylene compound formed by solvolysis, for example alcoholysis, which on addition of water is readily hydrolyzed to 3-formylrifamycin-SV. In the presence of water a hydrolysis leading to 3-formylrifamycin-SV may even have taken taken place already during the irradiation so that this compound, too, may be present in the irradiation solution.

For the manufacture of 3-formylrifamycin-SV the said compounds present in the irradiation solution or the mixture as a whole is subjected to hydrolysis, most advantageously with water, for example by adding a small quantity of water directly to the irradiation solution and allowing the whole to stand for some length of time, for example for 12 to 48 hours, at room temperature. After having evaporated the solvent pure 3-formyl-rifamycin-SV is accessible from the residue by the usual purifying methods, such as crystallization or chromatography. This process gives yields of about 90% of the theoretical of 3-formylrifamycin-SV referred to the weight of 3-aminomethyl-rifamycin-S used initially.

The 3-aminomethyl-rifamycin-S compounds of the above Formula V to be used as starting materials can be prepared from the corresponding hydroquinones, some of which are known [cf. for example British Patent 1,090,115 or Journ. Med. Chem. 8, page 790 (1965)] in known manner by mild oxidation, for example with air or oxygen, persulphates, potassium ferricyanide or alkylnitrites. New 3-aminomethyl-rifamycin-SV compounds are accessible in known manner, for example by reacting rifamycin S with at least 2 molecular equivalents of formaldehyde and an excess of the amine corresponding to the amino group to be introduced.

According to a particularly advantageous manner of manufacturing the starting materials of the above The 3-aminomethyl-rifamycin-S compounds of the above Formula V the corresponding 3-aminomethyl-rifamycin-SV compounds are treated in a suitable organic solvent at a temperature of at most about 0° C. with excess potassium ferricyanide solution, if desired extracted at the same temperature with a water-immiscible solvent, the organic phase is separated, dried and freed from the solvent at a low temperature. In this manner it is possible to obtain quantitative yields of pure quinones which in the past had been isolated exclusively in the form of mangano salts.

The treatment with potassium ferricyanide solution may be carried out in a homogeneous or heterogeneous phase. It is advantageous to dissolve the starting materials in water-immiscible organic solvents, especially hydrocarbons, for example chlorinated aliphatic hydrocarbons such as chloroform, methylenechloride or carbon tetrachloride. On completion of the oxidation the organic phase is separated at a temperature below 0° C., then dried and finally freed from solvent at a low temperature. When the oxidation is carried out in a water-miscible solvent, such as dioxane or a ketone such as acetone, or in dimethylformamide, the reaction mixture is always extracted at a temperature below the freezing point with a water-immiscible organic solvent, for example one of those mentioned above and then further worked up as described.

Other objects of the present invention are, therefore, compounds of the above Formula V in pure form and the special process for their manufacture described above.

The compounds of the above Formula V are also important as antibiotically active compounds having a high antibacterial activity against gram-positive and gram-negative bacteria and being little toxic. Thus, for instance, both in vitro and in vivo, they develop, for example on infected mice, a strong antibacterial activity against *Staphylococcus aureus* and *Mycobacterium tuberculosis*. They may thus be used as medicaments in the treatment of bacterial infections.

Of special value are the above-mentioned groups and specific compounds of this type of compounds.

The present invention includes also any variant of the present process in which an intermediate obtained at any stage is used as starting material and any remaining steps are carried out or in which a starting material is formed under the reaction conditions.

The present invention includes also the manufacture of pharmaceutical preparations for use in human and veterinary medicine which contain the pharmacologically active 3-aminomethyl-rifamycin-S compounds of the Formula V, accessible in pure form by the process described above, especially the compounds in this class mentioned as partcicularly active, as active ingredients together with a pharmaceutical excipient. The excipients used are organic or inorganic substances suitable for enteral, for example oral, parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be solid, for example tablets, dragees or capsules, or liquid or semi-liquid, such as solutions, suspensions, emulsions, ointments or creams. These pharmaceutical preparations may be sterilized and/or contain assistants such as preserving, stabilizing, wetting or emulsifying agents, salts for regulating the osmotic pressure or buffers. They may also contain other therapeutically valuable substances. The new compounds may also be used as starting materials for the manufacture of other valuable compounds.

The above compounds of the Formula V may also serve as additives to animal fodder.

The following examples illustrate the invention. The thin-layer chromatograms mentioned therein have been obtained on silicagel impregnated with citric acid in the system chloroform+acetone 3:1. The R$f$ values are referred to the R$f$ value of 3-diethylaminomethyl-rifamycin-SV=1, and are here designated as R$f_M$

EXAMPLE 1

A solution of 3-diethylaminomethyl-rifamycin-SV (R$f_M$=1) in chloroform is cooled to 0° C. and mixed at 0° C. with excess aqueous potassium ferricyanide solution alkalinized with sodium bicarbonate. While carefully cooling the mixture to 0° C., it is vigorously agitated for 5 minutes. The chloroform phase is then separated, cooled to −10° C., dried with sodium sulphate and evaporated at this temperature. The residue consists of pure, amorphous 3-diethylaminomethyl-rifamycin-S (R$f_M$=0.0) and is soluble in chloroform, dimethylformamide and in alcohols. The yield is quantitative. The substance can be reconverted quantitatively into 3-diethylaminomethyl-rifamycin-SV by means of ascorbic acid.

50 mg. of the resulting 3-diethylaminomethyl-rifamycin-S are dissolved at −10° C. in 2 ml. of dimethylformamide and diluted with ½ litre of isopropanol cooled to −10° C. The solution is introduced into a ½-liter sulphating flask provided with magnetic stirrer and cooling bath and cooled to −20° C. The batch is then irradiated for 5 minutes with an immersion lamp (mercury high-pressure burner Hanau Q81), while stirring and cooling well to maintain the temperature between −15° C. and −20° C. After the irradiation the reaction solution contains mainly a red-coloured substance (R$f_M$=1.67) which, when allowed to stand in aqueous isopropanol, is converted into 3-formyl-rifamycin-SV. The cooling bath is removed, 5 ml. of water are added to the irradiated solution and the whole is kept for 3 days at room temperature. Finally, it is evaporated and the resulting 3-formyl-rifamycin-SV is purified by chromatography (on silicagel, with chloroform +10% acetone), to yield 42 mg. of 3-formylrifamycin-SV (R$f_M$=8.6) which crystallize from tetrahydrofuran. Yield: 90% of the theoretical.

EXAMPLE 2

3 g. of potassium ferricyanide and 500 ml. of water are added to a solution of 2.0 g. of 3-piperidinomethyl-rifamycin-SV in 200 ml. of methanol, a clear, dark-red solution being obtained. The reaction mixture is allowed to stand for 5 minutes at 20° C., is acidified with citric acid and extracted with chloroform. After drying and evaporating the chloroform in vacuo, there are obtained 2 g. of 3-piperidinomethyl-rifamycin-S of R$f_M$=0.

50 mg. of 3-piperidinomethyl-rifamycin-S are dissolved in 500 ml. of isopropanol. The solution is irradiated in a 500 ml. sulphonating flask at 20° C. for seven minutes with an immersion lamp Hanau Q81. After irradiation, the reaction solution contains mainly a red-coloured substance (R$f_M$=1.80). 5 ml. of water are added to the irradiated solution and the batch is allowed to stand at room temperature for 3 days. Finally, it is evaporated and the 3-formyl-rifamycin-SV formed is purified by chromatography (on silicagel, chloroform with 10% acetone). More than 42 mg. of 3-formyl-rifamycin-SV (R$f_M$=8.6) are obtained. The product can be recrystallized from tetrahydrofuran.

We claim:

1. A process for the manufacture of 3-formyl-rifamycin-SV, wherein a 3-aminomethyl-rifamycin-S compound of the formula

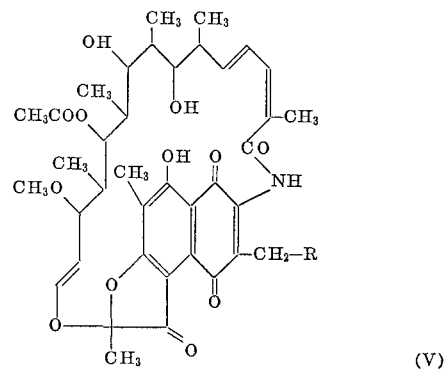

(V)

in which R represents a member selected from the group consisting of a free and a substituted amino group is irradiated with ultraviolet light in a solvent selected from the group consisting of an anhydrous and an aqueous solvent and any obtained 3-aldehyde derivative of 3-formyl-rifamycin-SV is hydrolysed.

2. A process as claimed in claim 1, wherein irradiation with artificially produced ultraviolet light is carried out at a low temperature.

3. A process as claimed in claim 1, wherein irradiation with artificially produced ultraviolet light is carried out at temperatures below −10° C.

4. A process as claimed in claim 1, wherein the irradiation with ultraviolet light is carried out in an alcohol as solvent.

5. A process as claimed in claim 1, wherein the irradiation with ultraviolet light is carried out in a lower aliphatic alcohol with branched carbon atom chain.

6. A process as claimed in claim 1, wherein the irradiation with ultraviolet light is carried out below −10° C. in isopropanol.

7. A process as claimed in claim 1, wherein a 3-aldehyde derivative of 3-formyl-rifamycin-SV is hydrolysed by the action of water.

8. A process as claimed in claim 1, wherein water is added to the reaction mixture obtained by irradiation and the mixture is kept for a few days at room temperature.

9. A process as claimed in claim 1, wherein the starting material is dissolved in a member selected from the group consisting of dimethyl and diethylformamide, the solution is diluted with isopropanol and is irradiated with ultraviolet light at about $-20°$ C. to $-15°$ C., then water is added and the mixture is kept for a few days at room temperature.

10. A process as claimed in claim 1, wherein starting compounds of the Formula V are used, in which Formula R is an amino group substituted by a member selected from one and two aliphatic, aromatic, cycloaliphatic, araliphatic and heterocyclic hydrocarbon radicals having from 1 to 8 carbon atoms.

11. A process as claimed in claim 1, wherein starting compounds of the Formula V are used, in which Formula R represents a mono-lower alkylamino group.

12. A process as claimed in claim 1, wherein starting compounds of the Formula V are used, in which Formula R represents a di-lower alkylamino group.

13. A process as claimed in claim 1, wherein a starting compound of Formula V is used, in which R represents a di-ethylamino group.

14. A process as claimed in claim 1, wherein a starting compound of Formula V is used, in which R represents a lower alkylenamino group selected from the group consisting of pyrrolidino, piperidino, piperazino and morpholino.

References Cited

Maggi et al.: Jour. Med. Chem., vol. 8 (1965), pp. 790–793.

HOWARD S. WILLIAMS, Primary Examiner